Oct. 9, 1951 D. H. VAN HOVE 2,570,409
SEAT BACK CUSHION SPRING CONSTRUCTION
Filed May 21, 1945 4 Sheets-Sheet 1
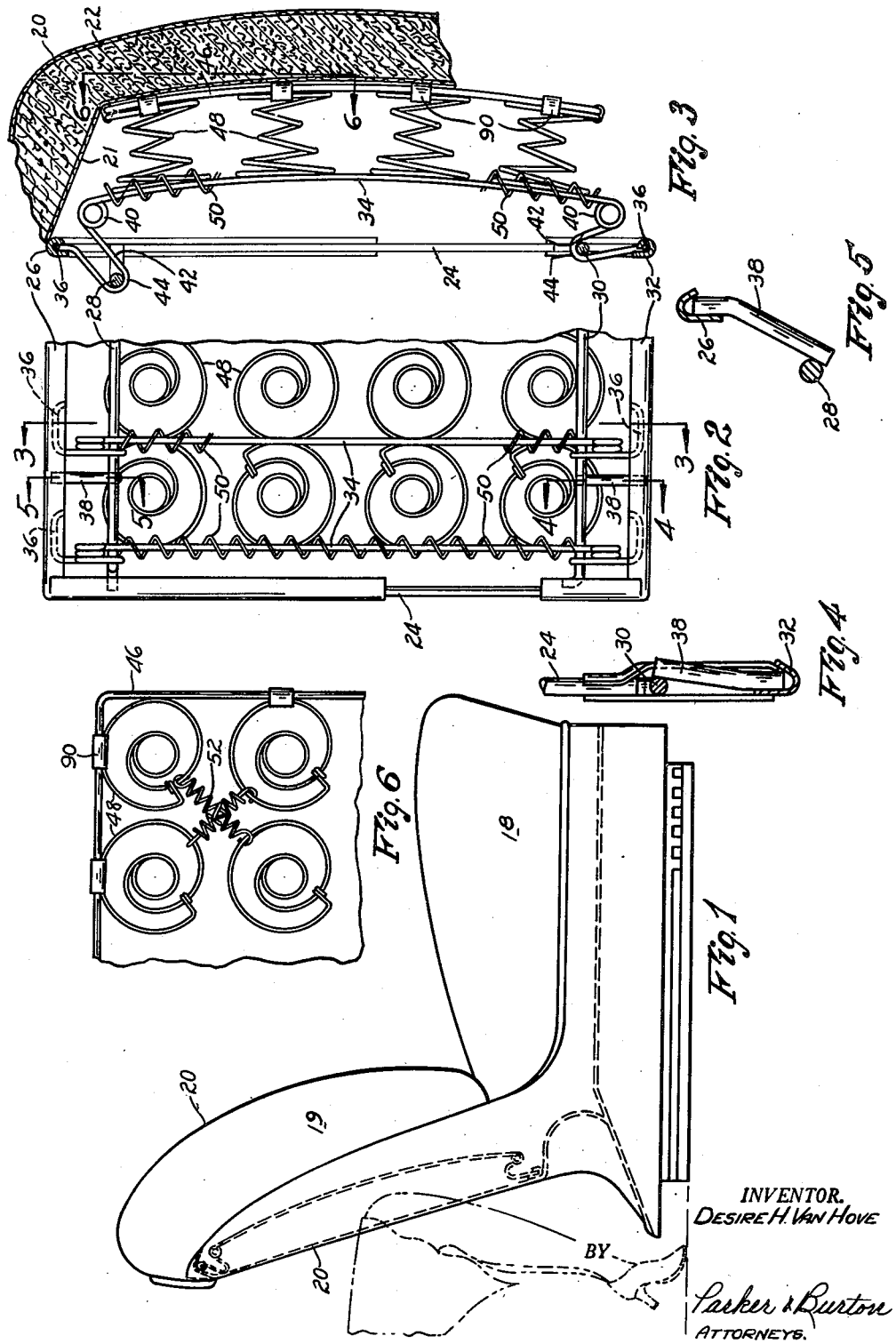
INVENTOR.
DESIRE H. VAN HOVE
BY
Parker & Burton
ATTORNEYS.

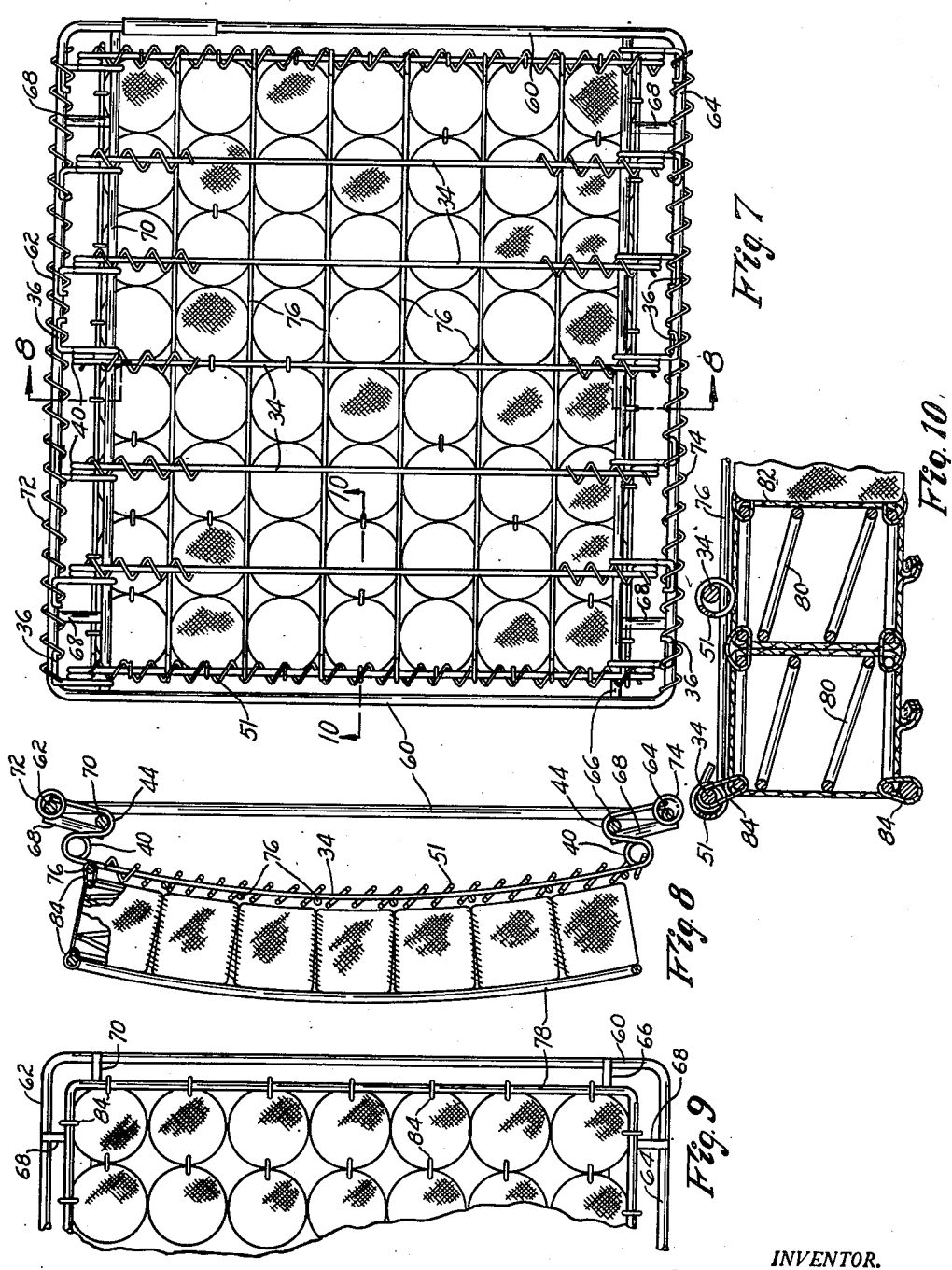

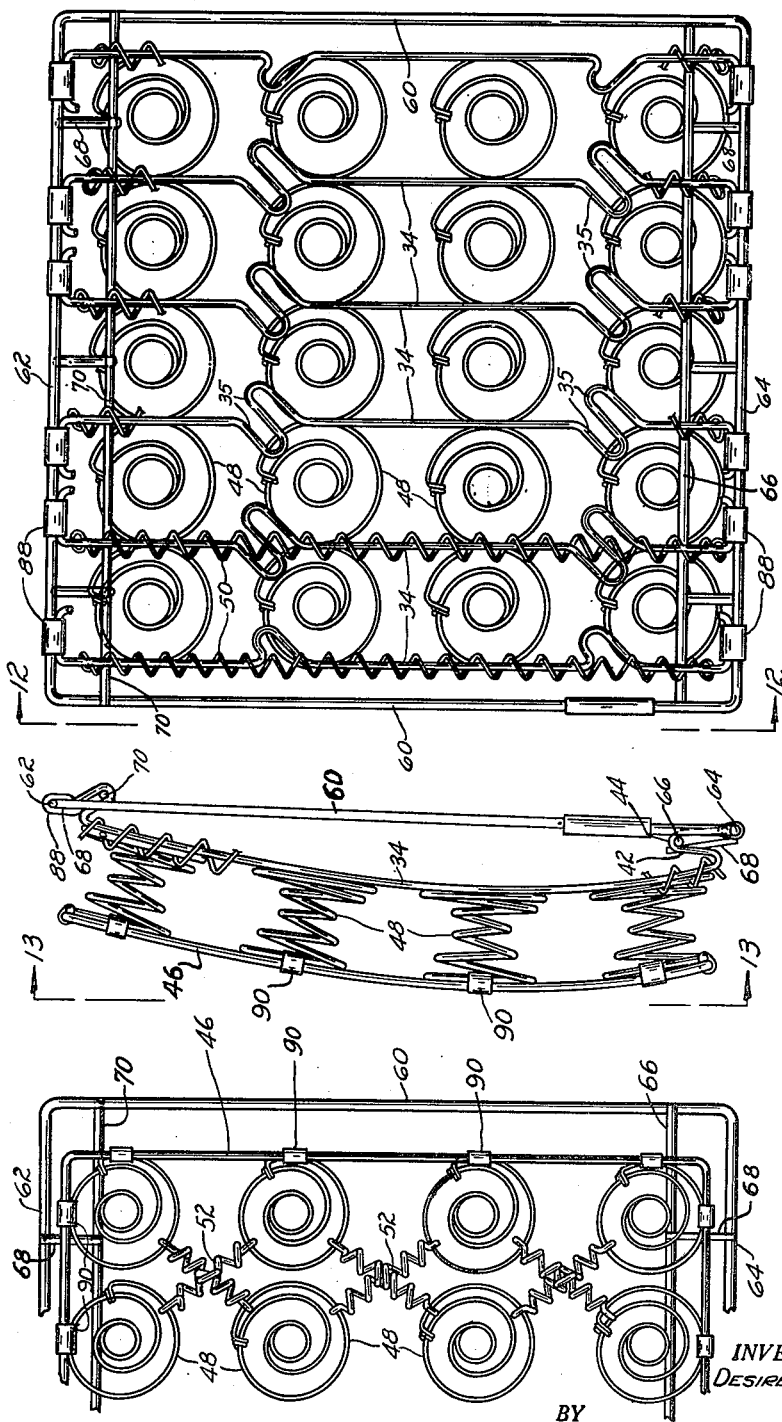

Oct. 9, 1951 D. H. VAN HOVE 2,570,409
SEAT BACK CUSHION SPRING CONSTRUCTION
Filed May 21, 1945 4 Sheets-Sheet 4
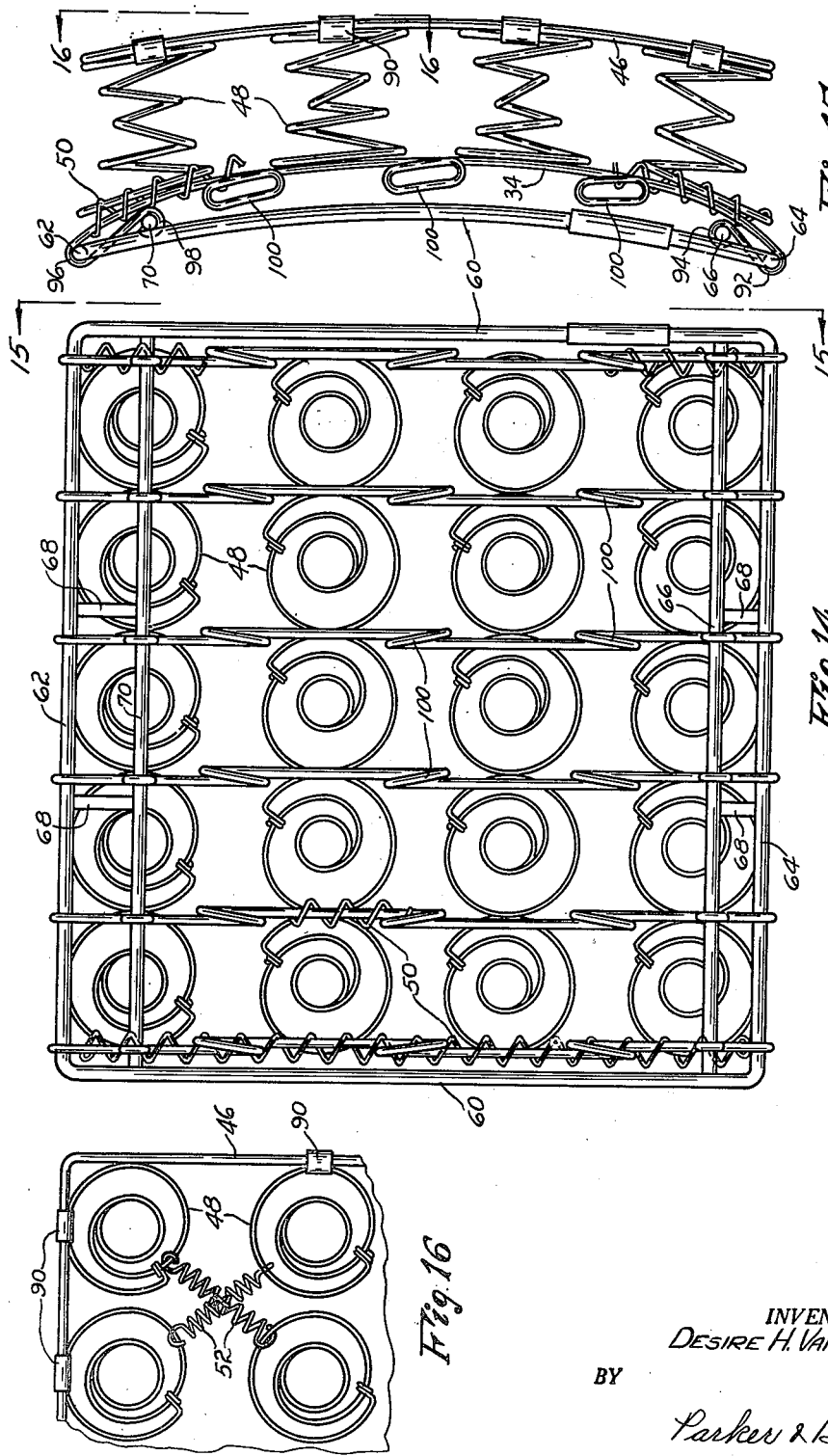
INVENTOR.
DESIRE H. VAN HOVE
BY
Parker & Burton
ATTORNEYS.

Patented Oct. 9, 1951

2,570,409

UNITED STATES PATENT OFFICE 2,570,409

SEAT BACK CUSHION SPRING CONSTRUCTION

Desire H. Van Hove, Northville, Mich., assignor to Falls Spring & Wire Company, Detroit, Mich., a corporation of Michigan, and Great Lakes Spring Corporation, Chicago, Ill., a corporation of Illinois Application May 21, 1945, Serial No. 595,017

9 Claims. (Cl. 155—179)

This invention relates to an improved seat back cushion spring construction.

An object is to provide a seat back cushion spring construction such as is used in automobile seat structures and particularly as a seat back cushion for the front seat of an automobile wherein the rear seat is closely coupled with respect to the front seat. This improved seat back cushion is so formed as to increase the space forwardly of the rear seat. Specifically this improved seat back cushion is bowed forwardly so as to increase the knee space of the passengers occupying the rear seat. The upholstery cloth which extends over the back of the front seat back cushion extends as a flat plane from the top to the bottom but is provided with sufficient flexibility to yield forwardly to make available the space provided by the forward bowing of the back cushion spring structure of the front seat.

An object is to provide a seat back cushion of the character described which is light in weight, of inexpensive construction, and which provides maximum cushioning characteristics with the employment of a minimum amount of light weight spring material.

Another object is to provide a seat back cushion, which includes a cushion spring assembly made up of a plurality of conventional spring coils over which wadding and upholstery cloth are stretched, which assembly is supported upon and secured to the forwardly bowed faces of a plurality of forwardly bowed substantially upright spaced spring elements which extend between top and bottom frame structures.

A meritorious feature is that these spring elements are so secured to the top and bottom frame structures as to have their forwardly bowed portions spaced forwardly from the top and bottom frame structures not only throughout their intermediate portions but preferably also at their ends thereby increasing the flexibility of the assembly and increasing the depth of the concavity formed at the rear of the spring assembly within the boundary of the supporting frame.

Each forwardly bowed spring element has its opposite ends bent toward each other and rearwardly and secured to the top and bottom frame structures. These inwardly bent ends may preferably be looped so as to provide a spring coil which spaces the forwardly bowed portion of each spring element a distance equal at least to the diameter of the coil forwardly of the top and bottom frame structures.

A meritorious feature is that each top frame structure may comprise a pair of substantially parallel spaced frame members and each bottom frame structure may comprise a pair of substantially parallel spaced frame members and the forwardly bowed spring elements which extend between these top and botom frame structures may be looped at each end over one frame member and secured to the companion parallel frame member so as to support the forwardly bowed portion of the spring element spaced ahead of the frame member.

More particularly, each spring element may have its opposite ends bent inwardly toward each other and also bent rearwardly and looped upon itself so as to provide a spring coil at each end. The lower coil has an end extension that is preferably looped over the upper bottom frame member and secured to the lower bottom frame member. The upper coil has an end extension which is preferably looped over the lower frame top frame and secured to the upper top frame member. The spring coils at the ends of the forwardly bowed spring elements are thereby supported spaced forwardly of and intermediate the two parallel top frame members and the two parallel bottom frame members.

The forwardly bowed portion of each spring element may be provided at spaced intervals intermediate its ends with integrally formed loops to increase its resilience. The spring coils of the spring cushion assembly which is supported upon the convex faces of the forwardly bowed spring elements may be secured thereto by helical springs sleeved lengthwise over each spring element and interlocked with the spring coils of the cushion assembly. The spring coils of the cushion assembly may likewise be connected together at their upper ends by helical cross springs.

Other objects, advantages and meritorious features will more fully appear from the following description, appended claims and accompanying drawings, wherein:

Figure 1 is an end elevation of an automobile front seat embodying my invention.

Figure 2 is an elevation from the underside of a fragment of a preferred form of my improved back cushion assembly.

Figure 3 is a transverse sectional view taken on the line 3—3 of Figure 2.

Figure 4 is a fragmentary sectional view taken on the line 4—4 of Figure 2.

Figure 5 is a fragmentary sectional view taken on the line 5—5 of Figure 2.

Figure 6 is a top plan view of a fragment of the spring structure shown in Figure 2.

Figure 7 is an elevation of the underside of a spring cushion construction embodying my invention and representing a modification as compared with the structure disclosed in Figures 2 through 6.

Figure 8 is a transverse sectional view taken on the line 8—8 of Figure 7.

Figure 9 is a plan of a fragment of the structure shown in Figure 7 taken from the upper side.

Figure 10 is a cross sectional view taken on the line 10—10 of Figure 7.

Figure 11 is an underside plan of a second modified form of my improved spring cushion construction.

Figure 12 is a side elevation taken on the line 12—12 of Figure 11.

Figure 13 is a top plan of a fragment of the construction shown in Figure 11.

Figure 14 is an underside plan of a third modification of the improved spring cushion construction.

Figure 15 is an elevation view taken on the line 15—15 of Figure 14.

Figure 16 is a plan from the top of a fragment of the structure shown in Figure 14.

This improved spring construction is here shown on four sheets of drawings, each one of which represents a slightly modified form of construction. Figure 1 might illustrate any one of the spring constructions in use as a back spring cushion for a front seat wherein 18 indicates the seat cushion and 19 the back cushion and 20 indicates the line of the upholstery cloth which is extended over the back cushion and down over the back from top to bottom of the back and is secured in place in a conventional manner. Underneath the upholstery cloth 20 and spread over the spring cushion is suitable wadding or padding material indicated in Figure 3 as 22. A sheet of burlap 21 may be interposed between the wadding 22 and the springs. The spring cushion has a concave rear face, that is the cushion structure is bowed forwardly, so that a space is provided between the upholstery cloth 20 and the rear face of the spring cushion assembly which increased the knee space for occupants of the rear seat of the vehicle. Such a construction is particularly advantageous in close coupled body designs such as certain of the coupé and 2-door closed cars.

The structure shown in Figures 2, 3 and 4 might be considered a preferred assembly. It includes a rectangular supporting frame having end portions 24 connected at the top by a top frame structure which consists of a pair of substantially parallel spaced upper and lower frame members 26 and 28 respectively. The end portions 24 are connected at the bottom by a bottom frame structure which consists of a pair of substantially parallel spaced upper and lower frame members 30 and 32 respectively. The upper top frame member 26 and the lower bottom frame member 32 is formed of channel shaped sheet metal strips within which are seated and secured the upper and lower ends of a plurality of forwardly bowed spring elements 34. These spring elements extend between the top and bottom frame structures and are disposed in substantially parallel spaced upright relationship as shown in the drawing.

The opposite ends of each of these forwardly bowed spring elements are bent as at 36 and are held within the channel of the frame members 26 and 32 respectively as shown in Figures 2, 4 and 5 by having the side walls of the channel of the elements 26 and 30 crimped together between the ends 36. Spacers 38 extend between the frame members 26 and 28 and the frame members 30 and 32 to maintain the spaced relationship as shown in Figure 2. These spacers 38 may be welded at the ends to the frame members which they connect.

Each spring element 34 is looped upon itself at each end providing spring coils 40. The end portions of the spring element extend beyond the coils inwardly toward each other as at 42 and extend rearwardly and are looped over the two innermost frame members 28 and 30 as at 44. Such end portions then extend outwardly to be engaged within the metal channel strips 32 and 26 as heretofore described. This method of supporting the spring elements 34 to extend between the top and bottom frame structures positions them so that their forwardly bowed portions are spaced forwardly of the top and bottom frame structures and the spring coils 40 are spaced forwardly of the interval between the two top frame members and the two bottom frame members as shown particularly in Figure 3.

A spring cushion assembly comprising a rectangular boundary wire 46 and a plurality of spring coils 48, which spring coils are of the conventional hour glass type, is supported upon the convex face of the several spring elements 34. These hour glass spring coils 48 are secured to the spring elements 34 by a helical coil spring 50. A helical coil spring 50 is sleeved over each spring element 34 as shown in Figures 2 and 3 and engages the lower winding of the hour glass coils 48 which rest directly upon the spring element 34. These hour glass coils 48 are secured together at their outer ends by cross springs 52 as shown in Figure 6.

This entire cushion spring assembly is secured in some suitable conventional manner to the back frame of the front seat and the wadding 22 and upholstery cloth 20 which superimposes the spring cushion is drawn over the upper and lower margins and the upholstery cloth is carried over the back and fastened at the bottom in any suitable fashion to complete the trimming. The invention does not reside in the upholstery cloth or wadding assembly but in the spring cushion assembly.

On Sheet 2, which includes Figures 7 through 10, a similar type of spring structure is shown to that heretofore described. The supporting frame is here shown as formed of a rectangular boundary wire having end portions 60 and top and bottom portions 62 and 64 respectively. An inner bottom frame member 66 extends between the end portions 60 spaced from and substantially parallel to the lower bottom frame member 64. Spacer pieces 68 extend between the frame members 64 and 66 and may be welded at the ends thereto and the frame member 66 may be welded at its ends to the end frame members 60. At the top a frame member 70 extends substantially parallel to and in spaced relationship with the top frame member 62 and may be welded at its ends to the end frame members 60 and spacer members 68 are provided as heretofore described.

Forwardly bowed spring elements 34 such as are shown and described in connection with Figures 2 and 3 are provided and extend between these top and bottom frame structures. Each spring element 34 is looped upon itself providing a coil 40 at each end and is further looped as at 44 over the frame members 66 and 70 and has end portions 36 which extend along and are secured to the top and bottom frame members 62 and 64 as shown in Figures 7 and 8. A helical spring 72 is sleeved over each top frame member 62 securing the end portions 36 of the spring elements 34 to the frame member shown in Figures 7 and 8. A helical spring 74 is sleeved over the bottom frame member 64 securing the end portions 36 of the spring elements 34 thereto as shown in Figures 7 and 8. A helical spring 51 is sleeved over the outwardly bowed portion of each spring element 34 as shown in Figures 7 and 8, in the same manner as is described in connection with the structure of Figures 2 and 3, to secure supporting wires 76 in spaced relationship extending transversely across the bowed faces of the spring elements 34.

A conventional spring cushion assembly which may include a boundary frame wire 78 and a plurality of coil springs 80 each disposed within a fabric pocket 82 is provided. These fabric pockets may be stitched or tied together with wire clips 84 and may also be clipped to the cross wires 76 and the boundary wire 78 by clips 84. This cushion spring assembly may be substituted for the cushion spring assembly shown in Figures 2 and 3 or vice versa.

On sheet 3, Figures 11, 12 and 13, is shown a slightly modified form of construction wherein the supporting frame is of substantially the same character as that shown in Figure 7. In other words, it comprises a rectangular wire frame having a pair of spaced parallel top frame members 62 and 70 and a pair of spaced parallel bottom frame members 64 and 66. These two pairs of top and bottom frame members are held together by end frame members 60 and are held in spaced relationship by spacers 68 all as heretofore described in connection with the description of the construction of Figure 7.

Outwardly bowed spring elements 34 extend between and are secured to the top and bottom frame structures. These spring elements 34 are similar to the spring elements 34 described in connection with the description of the structures heretofore described except that they are not provided with spring coils at the ends but are looped intermediate their ends at spaced intervals as at 35 in Figure 11 to increase their spring characteristics. At the ends they are bent toward each other and inwardly as at 42 and looped as at 44 over the top and bottom frame members 70 and 66 respectively and secured to the upper top member 62 and the lower bottom member 64 by metal clips 88 as shown in Figures 11 and 12.

A spring cushion assembly similar to that shown in Figures 2 and 3 is supported upon the convex faces of the spring elements 34. It comprises a series of hour glass shaped spring coils 48 secured together at their tops by the helical cross spring 52 as heretofore described and secured to the outwardly bowed portions of the spring elements 34 by helical springs 50 as heretofore described in connection with the description of Figures 2 and 3. The spring coils 48 may also be secured by clips 90 to the boundary wire 46 as shown.

Sheet 4, Figures 14, 15 and 16, illustrates a modification of the construction shown in earlier figures and resembles somewhat the structure shown in Figures 11, 12 and 13. The rectangular wire frame shown in Figure 11 is employed. It comprises end portions 60 connected by an upper top frame portion 62 and by a lower bottom frame portion 64. At the top there is also a lower top frame member 70 which extends between and is secured to the end portions 60 and is held in substantially spaced parallel relationship with the upper top frame member 62 by spacers 68. At the bottom there is an upper bottom frame member 66 which extends between and is secured to the end portions 60 and is held in spaced parallel relationship with the bottom frame member 64 by spacers 68.

Mounted upon this rectangular frame are upright parallel horizontally spaced forwardly bowed spring elements 34 of a character generally similar to those heretofore described and particularly to the spring elements described in connection with the structure shown in Figures 11 and 12. These spring elements 34 extend between and are secured to the top and bottom frame structures. Each spring element 34 is bent at 92 adjacent its lower end over the bottom frame member 64 and secured at its end to the upper bottom frame member 66 by being coiled thereabout as shown at 94. At its upper end each spring element 34 is bent upon itself as at 96 over the upper frame member 62 and is coiled as at 98 about the lower top frame member 70 as shown in Figure 15. Each spring element 34 is also coiled upon itself as at 100 at spaced points between its ends so as to increase its resiliency characteristics.

There is secured to and upon the convex faces of the spring elements 34 a cushion spring assembly made up of a plurality of spring coils of hour glass shape the lower windings of which coils are secured to the spring elements 34 by helical coil spring 50 of the character shown in other figures of the drawing. This cushion spring assembly is provided with an upper boundary frame 46 of the character heretofore described which boundary frame is secured to the spring coils 48 by metal clips 90 as indicated in Figures 15 and 16 and as heretofore described. The upper windings of these spring coils 48 are also shown as secured together by helical cross spring 52 as heretofore described.

The spring cushion assembly shown in these figures as well as the one shown in Figures 11, 12 and 13 and Figures 7 through 10 would be completed through the employment of suitable padding and upholstery cloth as illustrated in connection with the structure shown in the first six figures of the drawing. In each modification the spring elements 34 extend between the top and bottom frame members and are bowed forwardly and are looped to increase their resilience and upon the convex faces of these spring elements there is mounted the cushion spring assembly which may be of conventional form as shown in the figures in the drawing. A complete spring unit is provided which is convenient to install and provides a maximum amount of spring characteristic in a compact light weight spring structure.

What I claim is:

1. A seat back cushion spring construction comprising, in combination, a substantially upright frame including a pair of top frame members and a pair of bottom frame members, a plurality of spaced generally upright forwardly bowed continuous spring elements extending between said top and bottom frame members, each spring element having its upper end portion bent rearwardly and looped over the lower top frame member and secured to the upper top frame member and having its lower end portion bent rearwardly and looped over the upper bottom frame member and secured to the lower bottom frame member to thereby position said spring element spaced forwardly from said top and bottom frame members and a cushion spring assembly made up of a plurality of coil springs directly supported upon the forwardly bowed faces of said spring elements.

2. A seat back cushion spring construction comprising, in combination, a pair of top frame members, a pair of bottom frame members, a plurality of spaced generally upright forwardly convex spring elements, the forwardly convex portion of each spring element terminating at its upper end in a rearwardly disposed spring coil which terminates in an end portion that extends rearwardly and downwardly and bears against the lower top frame member and terminating at its lower end in a rearwardly disposed spring coil which terminates in an end portion that extends rearwardly and upwardly and bears against the upper bottom frame member and a cushion spring assembly made up of a plurality of coil springs supported upon the forwardly bowed faces of said spring elements.

3. A seat back cushion spring construction, comprising, in combination, a pair of substantially parallel vertically spaced top frame members, a pair of substantially parallel vertically spaced bottom frame members, a plurality of generally upright horizontally spaced substantially parallel forwardly convex spring elements, said spring elements terminating at opposite ends of their forwardly convex portions in rearwardly disposed spring coils, said coils terminating in end portions extending rearwardly and toward each other and looped over the lower top frame member and the upper bottom frame member and secured to the upper top frame member and the lower bottom frame member to thereby position said forwardly convex spring elements spaced forwardly of the top and bottom frame members by a distance equal at least to the diameter of said spring coils and a cushion spring assembly made up of a plurality of coiled springs supported upon the forwardly convex faces of said spring elements.

4. A seat back cushion spring construction comprising, in combination, a rectangular base frame having a pair of vertically spaced top frame members and a pair of vertically spaced bottom frame members, a plurality of generally upright horizontally spaced forwardly convex spring elements terminating at opposite ends in rearwardly disposed spring coils, each top spring coil terminating in an end portion extending downwardly and rearwardly over the lower top frame member and secured at its end to the upper top frame member supporting said top spring coil end of the forwardly convex spring element spaced forwardly of the interval between the upper and lower top frame members, each bottom spring coil terminating in an end portion extending upwardly and rearwardly over the top bottom frame member and secured at its end to the lower bottom frame member supporting said bottom spring coil end of the forwardly convex spring element spaced forwardly of the interval between the upper and lower bottom frame members, a cushion spring assembly made up of a plurality of parallel rows of spring coils supported upon the forwardly convex faces of said spring elements, with parallel rows superimposing said parallel intervals across said spring elements and a helical coil spring wound around the forwardly convex portion of each spring element securing said rows of spring coils thereto.

5. A seat back cushion spring construction comprising, in combination, a substantially upright frame assembly including a top frame structure and a bottom frame structure, a plurality of spaced apart generally upright forwardly bowed continuous spring elements extending between said top and bottom frame structures, said spring elements terminating at opposite ends in rearwardly bent end portions extending toward each other and supported upon and secured to said top and bottom frame structures to thereby position the forwardly bowed portions of said spring elements spaced forwardly of said top and bottom frame structures, a cushion spring assembly made up of a plurality of coil springs supported upon the forwardly bowed faces of said spring elements and a helical spring sleeved over the forwardly bowed portion of each spring element connecting the coil springs of the cushion spring assembly thereto.

6. A seat back cushion spring construction comprising, in combination, a top frame structure, a bottom frame structure, a plurality of spaced generally upright forwardly bowed continuous spring elements extending between said top and bottom frame structures, said spring elements terminating at opposite ends in rearwardly bent end portions extending toward each other and supported upon and secured to said top and bottom frame structures, to thereby position the forwardly bowed portions of said spring elements bowed forwardly between said top and bottom frame members, a cushion spring assembly made up of a plurality of coil springs supported upon the forwardly bowed portions of said spring elements and a helical spring sleeved over the forwardly bowed portion of each spring element connecting the coil springs of the cushion spring assembly thereto.

7. A seat back cushion spring construction comprising, in combination, a top frame structure, a bottom frame structure, a plurality of spaced generally upright forwardly bowed spring elements extending between said top and bottom frame structures, said spring elements terminating at opposite ends in rearwardly bent end portions extending toward each other and supported upon and secured to said top and bottom frame structures to thereby position the forwardly bowed portions of said spring elements bowed forwardly between said top and bottom frame members, each spring element having its forwardly bowed portion bent upon itself at spaced intervals providing a plurality of spring loops, a cushion spring assembly made up of a plurality of coil springs supported upon the forwardly bowed portions of said spring elements and a helical spring sleeved over the forwardly bowed portion of each spring element connecting the coil springs of the cushion assembly thereto.

8. A seat back cushion spring construction comprising, in combination, a top frame structure, a bottom frame structure, a plurality of spaced generally upright forwardly bowed spring elements extending between said top and bottom frame structures, said spring elements terminating at opposite ends in rearwardly bent end portions extending toward each other and secured to the top and bottom frame structures to thereby position said forwardly bowed spring elements spaced forwardly of said top and bottom frame structures, each spring element looped upon itself intermediate its ends at points spaced apart lengthwise thereof, a cushion spring assembly made up of a plurality of coiled springs supported upon the forwardly bowed portions of said spring elements, a helical spring sleeved lengthwise over each spring element securing the cushion coil springs thereto and helical springs extending between and connecting the top coils of said cushion coil springs together.

9. A seat back cushion spring construction comprising, in combination, a top frame structure, a bottom frame structure, a plurality of spaced apart generally upright forwardly bowed spring elements extending between said top and bottom frame structures, said spring elements terminating at opposite ends in rearwardly bent end portions extending toward each other and each bent outwardly upon itself forming an outwardly open U-shaped end portion secured at its extremity to the adjacent frame structure, the closed end of each U-shaped end portion bearing against the frame structure to which such end portion is secured spaced inwardly of the point of securement thereto to thereby position the forwardly bowed portions of said spring elements bowed forwardly between said top and bottom frame structures, each spring element having its forwardly bowed portion bent upon itself laterally a plurality of times at spaced intervals providing at each such interval a plurality of laterally extending spring loops, and a cushion spring assembly made up of a plurality of coil springs supported upon the forwardly convex faces of said spring elements.

DESIRE H. VAN HOVE.

REFERENCES CITED

The following references are of record in the file of this patent:

UNITED STATES PATENTS

| Number | Name | Date |
| --- | --- | --- |
| 102,386 | Flanigan | Apr. 26, 1870 |
| 405,821 | Bonnell et al. | June 25, 1889 |
| 655,756 | Buob | Aug. 14, 1900 |
| 2,022,892 | Marshall | Dec. 3, 1935 |
| 2,034,078 | Ball | Mar. 17, 1936 |
| 2,118,974 | Herman | May 31, 1938 |
| 2,148,961 | Pleet | Feb. 28, 1939 |
| 2,249,048 | Sandor | July 15, 1941 |
| 2,274,176 | Widman | Feb. 24, 1942 |
| 2,293,563 | Ruggles | Aug. 18, 1942 |
| 2,304,651 | Pudlo | Dec. 8, 1942 |
| 2,312,411 | Hopkes | Mar. 2, 1943 |
| 2,364,948 | Clark | Dec. 12, 1944 |
| 2,420,220 | Bartlett et al. | May 6, 1947 |

FOREIGN PATENTS

| Number | Country | Date |
| --- | --- | --- |
| 16,814 | Great Britain | July 19, 1909 |
| 551,627 | Germany | June 6, 1932 |
| 642,873 | Germany | Mar. 18, 1937 |